United States Patent [19]
Johnson

[11] 3,786,921
[45] Jan. 22, 1974

[54] HEATER BYPASS AND SHUT-OFF VALVE

[75] Inventor: Charles S. Johnson, Laguna Niguel, Calif.

[73] Assignee: Baker Hydro, Inc., Santa Ana, Calif.

[22] Filed: Feb. 14, 1972

[21] Appl. No.: 226,115

[52] U.S. Cl................. 210/130, 210/169, 210/181
[51] Int. Cl............................................ B01d 35/14
[58] Field of Search..... 210/97, 130, 132, 133, 137, 210/169, 181, 186

[56] References Cited
UNITED STATES PATENTS

| | | | |
|---|---|---|---|
| 2,979,733 | 4/1961 | Saint Clair et al.............. | 210/169 X |
| 3,528,548 | 9/1970 | Sheckler......................... | 210/169 X |
| 2,865,442 | 12/1958 | Halford et al................... | 210/130 X |
| 2,499,494 | 3/1950 | Greer.............................. | 210/130 X |

FOREIGN PATENTS OR APPLICATIONS

| | | | |
|---|---|---|---|
| 308,278 | 11/1929 | Great Britain..................... | 210/181 |
| 1,077,823 | 11/1954 | France................................ | 210/97 |

*Primary Examiner*—John Adee
*Attorney, Agent, or Firm*—Allan R. Fowler et al.

[57] ABSTRACT

A shut-off device for a heater for water in continuous circulation, as in the filtering line for a swimming pool, is disclosed. The flow of water through the system is monitored by a bypass connected between the input and the output of the heater, shunting the coils in the heater. A spring-loaded valve is mounted in the bypass so as to close the bypass except when the flow of water to the heater input exceeds that required to maintain a desired minimum flow through the heater. The valve controls a heater disabling device, so that the heater may be on only when the bypass valve is open.

6 Claims, 5 Drawing Figures

PATENTED JAN 22 1974

HEATER BYPASS AND SHUT-OFF VALVE

BACKGROUND OF THE INVENTION

It has been a general practice, in water heating systems in which the flow of water to be heated is to exercise any control over the operation of the heater, to include in the direct line of flow of water to or through the heater some type of flow responsive member which maintains the heater disabled when there is no flow of water and activates the heater when there is a flow of water. Such controls are found in association with general purpose heaters for supplying heated water for industrial or residential use. In such systems the flow of water is normally arrested at a tap, and the heater control device is arranged to activate the heater as soon as even a small flow of water is permitted at the tap, so that full flow is not required in order to obtain heated water.

Such a heater control is not considered to be suitable for use with a swimming pool heater, for the reason that the water circulation system for a swimming pool usually includes a filter which, as it performs its function of trapping debris, offers increasing impedance to the flow of water, particularly in the case of outdoor pools into which fall such debris as leaves, twigs, insects and dust. If the servicing of the filter is neglected and the flow of water diminishes to such an extent that continued operation of the heater may result in damage to that unit, the heater should, of course, be shut down.

SUMMARY OF THE INVENTION

In accordance with the present invention, a heater cut-off device includes a water flow responsive member that is contained in a bypass duct connected in shunt with the water tubes or coils of the heater. The water flow responsive member is spring loaded so that it permits a flow of water through the bypass duct only when the flow of water from the pump exceeds by a predetermined amount the normal flow capacity of the heater. The spring loading may, if desired, be such that the heater will be disabled if the flow is insufficient to keep the water tubes or coils in the heater filled.

DESCRIPTION OF THE DRAWINGS

For a complete understanding of the invention, reference may be had to the following detailed description, to be interpreted in the light of the accompanying drawings wherein.

DETAILED DESCRIPTION

Figure 1:
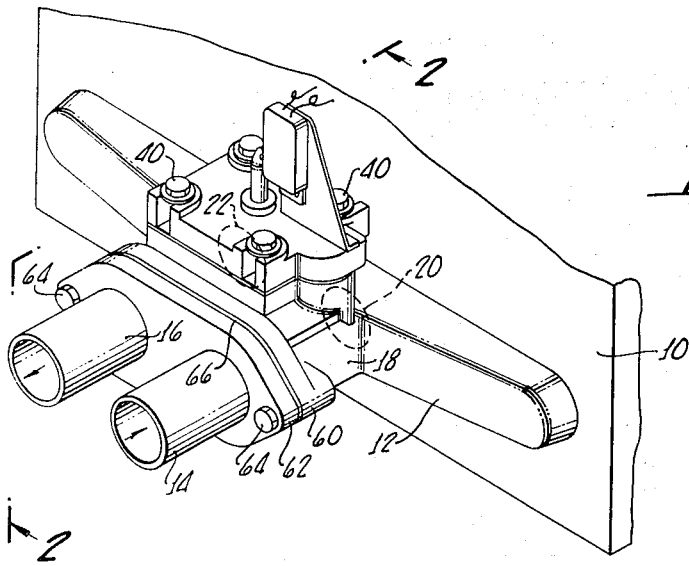
FIG. 1 is a fragmentary perspective view showing a portion of the housing of a heater with the inlet and outlet pipes and a shut-off device in accordance with the present invention associated therewith.
Figure 2:
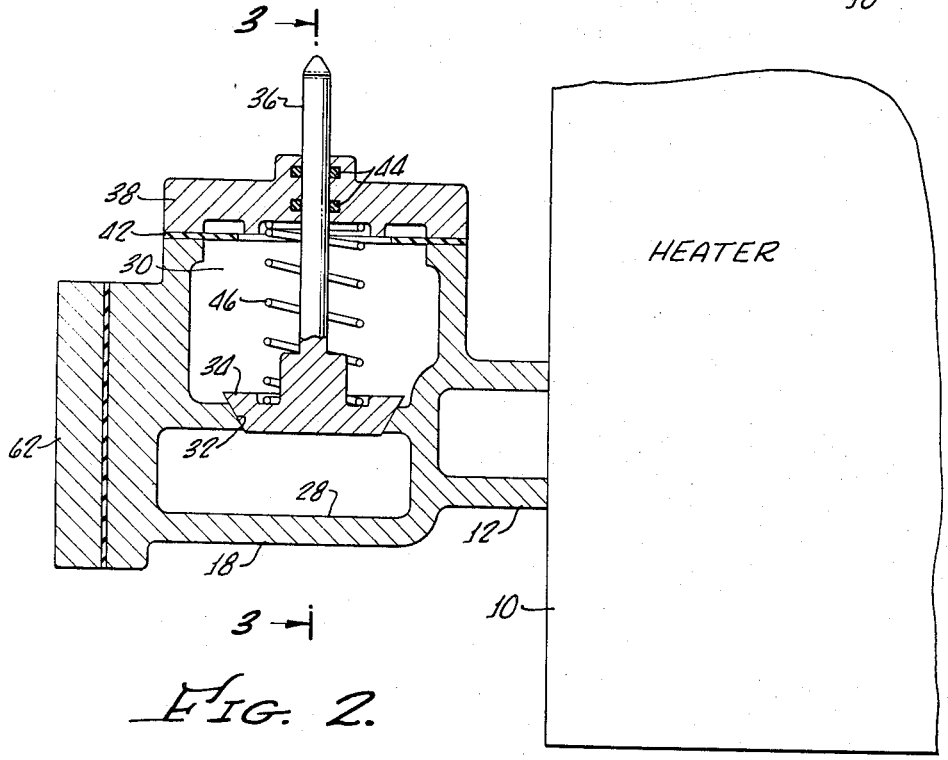
FIG. 2 is a vertical sectional view taken generally on the line 2—2 of FIG. 1.
Figure 3:
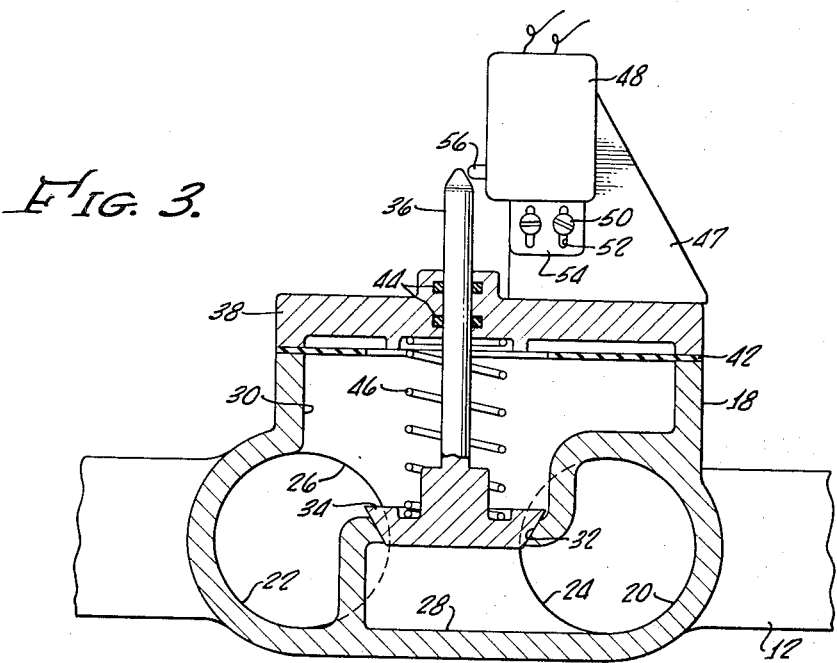
FIG. 3 is a vertical sectional view taken generally on the line 3—3 of FIG. 2 and showing the shut-off device in the same condition as in FIG. 2.
Figure 4:
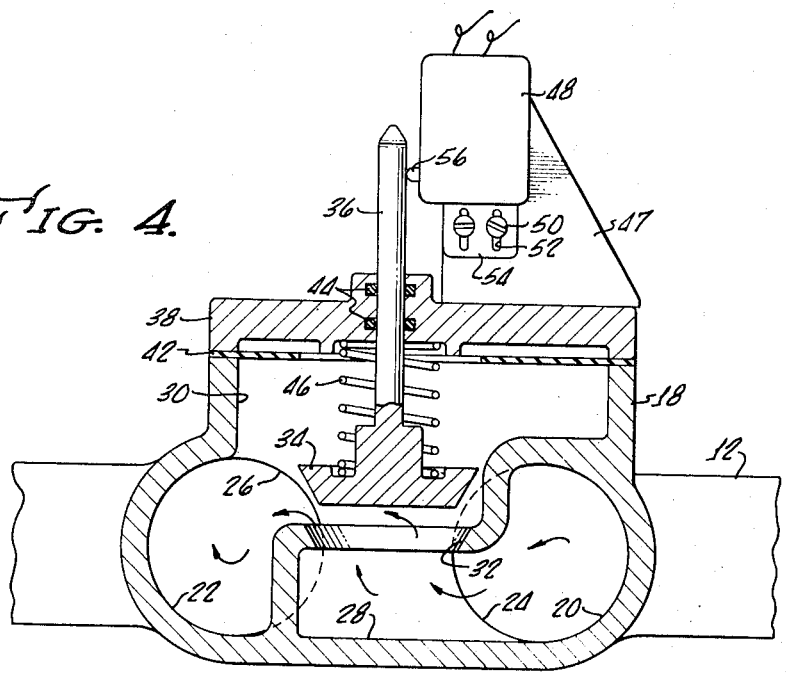
FIG. 4 is a vertical sectional view taken on the same line as FIG. 3 but showing the shut-off device in a different operative condition.

Referring now to the drawings and particularly to FIG. 1 the reference numeral 10 designates a heater, which may be gas fired or electrically energized, for heating the water in a swimming pool. Only a fragment of the casing of the furnace has been shown in FIG. 1. In accordance with usual practices the heater 10 will contain one or more coils (not shown) through which the water to be heated is circulated. Attached to the housing of the heater 10 is a manifold 12 through which water is routed from an inlet pipe 14 to the one or more water tube coils in the furnace 10 and from which the heated water is routed to an outlet pipe 16. The manifold 12 has associated therewith a bypass structure 18, the interior of which is shown in FIGS. 2, 3 and 4. As is indicated in FIGS. 1 and 2 the manifold 12 and the bypass chamber 18 may be a unitary cast structure, preferably of a corrosion resistant material such as brass or bronze.

As shown in FIGS. 3 and 4 the bypass structure 18 is provided with inlet and outlet passages 20 and 22 respectively that are in communication with inlet and outlet orifices 24 and 26 respectively in the manifold 12. In addition the inlet passage 20 in the bypass structure 18 is in communication with a lower chamber 28 of the bypass structure and the outlet passage 22 is in communication with an upper chamber 30 in the bypass structure. The wall separating the lower and upper chambers 28 and 30 is provided with a circular aperture 32 through which water may flow from the lower chamber 28 to the upper chamber 30.

The wall of the aperture 32 is preferably of inverted frusto-conical contour to provide a seat for a valve 34 which is provided with a stem 36 that passes through a cover 38 for the upper chamber 30. The cover 38 may be secured to the bypass structure 18 by bolts 40 (FIG. 1) and a gasket 42 may be compressed between the cover 38 and the bypass structure 18 to render it water tight. The aperture in the cover 38 through which the valve stem 36 passes may also be provided with packing glands 44 to render that aperture water tight. A compression spring 46 surrounds the valve stem 36 and, being backed by the cover plate 38 for the bypass structure 44 and engaging at its opposite end the valve 34 it forces the valve 34 to seat in and close the aperture 32 in the absence of sufficient water pressure in the bypass chamber 28 to lift the valve.

The cover plate 38 for the bypass structure 18 supports a bracket 47 which adjustably supports an electrical switch 48 by means of clamping screws 50 passing through slots 52 in a mounting plate 54 for the switch 48 and threadedly engaging the bracket 47. The operator member 56 for the switch 48 is presented in the path of the free end of the valve stem 36 which is preferably tapered to permit the valve stem 36 to depress the switch operating plunger 56 as the valve stem rises. As indicated in FIG. 3, when the valve 34 is seated in the aperture 32, the free end of the valve stem 36 is disengaged from the operator 56 for the valve 48 and the operator is in its released or unoperated condition. When water pressure in the lower chamber 28 of the bypass structure 18 lifts the valve 34 the stem 36 depresses the operator 56 for the switch 48 to its operated or on condition. The slotted mounting for the switch 48 provides adjustability of the switch operating plunger 56 relative to the valve stem 36, whereby the extent of displacement of the valve required to operate the switch plunger 56 may be varied. Also, the spring 46 could be located outside the bypass structure and made adjustable in order to vary the resistance of the valve 32 to displacement by water in the bypass chamber 28.

As is well known water heaters may be provided with a manual control for activating the heater and it is also usual to provide a thermostatic control for disabling the heater when the temperature of the water has risen to a predetermined value. Such controls are well known and have not been disclosed herein. The switch 48 is an additional control for the heater and its relation to the other controls is such that if the valve 34 is seated in the aperture 32 and the operator 56 for the switch 48 is thus off the heater will be disabled even though the manual control may be in the ON condition and the thermostatic control may be calling for heat. The switch 48 may control the turning on and off of the heater, whether it is an electric heater or a fuel fired heater, in the same way that thermostatically controlled switches turn heaters on and off and when the switch 48 is ON it qualifies the heater for operation although the heater may be disabled at either or both of the other two controls, namely, the manual and the thermostatic controls.

Referring again to FIG. 1 it will be noted that the bypass structure 18 may be provided, on its opposite side from the manifold 12, with a flange 60 which exposes the inlet and outlet passages 20 and 22 respectively. The inlet and outlet pipes 14 and 16 terminate in a companion flange 62 which is secured to the flange 60 by bolts 64, with a gasket 66 interposed between the two flanges to render the connection water tight.

Figure 5:
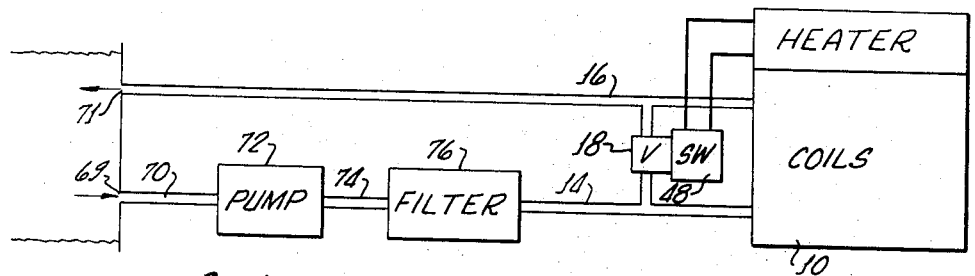
FIG. 5 is a schematic showing of a typical circulatory system associated with a swimming pool.

The functional relation of the heater and other external water handling components to the swimming pool is represented schematically in FIG. 5. As indicated, the outlet of the pool is connected through a pipe 70 to a motor driven pump 72 which in turn is connected by a pipe 74 to a filter 76. The filter 76 is connected by the previously identified inlet pipe 14 to the bypass structure 18 and to the heater 10 and the heater outlet pipe 16 returns directly to the swimming pool inlet 71. In FIG. 5 the bypass structure 18 is also identified by the letter V to indicate that it contains the valve 34, and the associated switch is identified by the reference numeral 48 as well as by the letters SW.

The underlying philosophy of the system hereinbefore described is that the water flowing through the coils in the heater does not directly operate upon and control the valve 34. The flow capacity of the pump 76 and lines 14 and 16 exceeds that of the heater 10. In normal operation, the pump provides a full flow through the heater and the excess pump output is shunted through the bypass 18 because the impedance to flow through the filled heater is sufficient that the excess flow provided by the pump develops sufficient pressure to open the valve 18. In that condition heater operation is safe without danger of burning out the coils and the switch 48 is ON.

As the pump operates and draws water from the pool and forces the water through the filter and then through coils of the heater and returns it to the pool, the filter may accumulate debris of various types and the debris tends to impede increasingly the flow of water through the filter. This increasing impedance tends to reduce the effectiveness of the pump, thus reducing the flow through the coils of the heater 10. Dependent upon the rate of accumulation of debris in the filter and the intervals between servicing of the filter the flow of water through the coils of the heater 10 might be reduced to such a value that if the heater were left in operation the coils might burn out. Before that condition occurs the drop in output of the pump permits the spring 46 to close the valve 34 and turn the switch 48 OFF SO that the heater will not operate.

The provision of the bypass structure 18 in shunt with the coils of the heater 10 assures that the heater will not be in the activated condition until there is a suffficient pressure on the valve 34 in the bypass structure 18 to lift the valve and operate the switch 48. This will in turn depend upon the amount of pressure that is exerted on the valve 34 by the spring 46 which is selected so that operation of the heater is prevented in the absence of a sufficient flow of water to keep the coils of the heater filled.

It will be understood that the liquid flow capacity of the bypass around the tubes or coils of the heater bears a fractional relationship to the liquid flow capacity of the heater tubes or coils, in order that there will be no greater flow of water through the bypass than is needed to control the operation of the heater reliably.

What is claimed is:

1. An improved liquid flow system of the type having a reservoir of liquid, a liquid filter, a heater for heating the liquid, a liquid pump and driving means therefor, and liquid conduits interconnecting said reservoir filter, heater and pump in circulatory relationship, wherein the improvement comprises:
    a liquid bypass device in shunt with the liquid flow path through the heater;
    a yieldably mounted valve adapted to close the liquid path through said bypass device;
    means for resisting the opening of said valve by liquid pressure on the input side of said bypass device except when the flow of liquid through the filter and pump is more than sufficient to maintain a predetermined flow of liquid through the heater; and
    means operable by said valve in its opened state for qualifying said heater for operation.

2. A system in accordance with claim 1 wherein the bypass device comprises a cast unitary structure interposably mountable between the inlet and outlet of said heater and the remainder of said liquid flow system and including:
    a first chamber in communication with the inlet to heater;
    a second chamber in communication with the outlet of heater; and
    a passage between said chambers that is closable by the valve.

3. A system in accordance with claim 1 wherein;
    the heater has its inlet and its outlet exposed in a plane for connection in circulatory relation to the pump and filter; and
    the bypass device comprises a cast unitary structure securable to the heater at the point of exposure of said inlet and outlet and containing:
    a first through-passage for communicative association of the heater inlet with the output side of the pump and filter portion of the circulatory system;
    a second through-passage for communicative association of the heater outlet with the input side of the pump and filter portion of the circulatory system; and an internal passage interconnecting the first and second through-passage and that is closable by the valve.

4. An improved fluid flow system of the type having a reservoir of fluid, a fluid heating device, a fluid pump and driving means therefore for propelling fluid from said reservoir through the fluid heating device, wherein the improvement comprises:
  a fluid bypass device in shunt with said fluid heating device;
  a valve adapted to close the fluid path through said bypass device;
  means for precluding the opening of said valve by fluid pressure across said bypass device except when the flow of fluid from the pump to the fluid heating device is more than sufficient to maintain a predetermined flow of fluid through the fluid heating device; and
  means operably associated with the valve for disabling the heating element of the heating device when the valve is closed.

5. In a water filtering and heating system:
  a reservoir of water to be filtered and heated;
  a heater tending to be damaged if operated at less than a predetermined flow of water therethrough;
  a pump connected between the reservoir and the heater and having a sufficient capacity to produce a flow of water in excess of said predetermined flow;
  a filter in series with said pump characterized by increasing resistance to flow of water therethrough in consequence of accumulation of debris therein;
  a bypass line shunting the heater; and
  a valve in the bypass line biased against opening of the line until subjected to water pressure indicative of a flow of water through the heater, at least equal to said predetermined flow.

6. Apparatus in accordance with claim 5 including:
  a switch operably associated with the valve to disable the heater except when the valve is open.

* * * * *